United States Patent [19]

Hayes

[11] Patent Number: 4,978,016
[45] Date of Patent: Dec. 18, 1990

[54] TAMPER INDICATING CLOSURE HAVING RETAINING HOOP WITH RELIEF WINDOWS

[75] Inventor: Thomas H. Hayes, Lancaster, Ohio

[73] Assignee: Anchor Hocking Corporation, Lancaster, Ohio

[21] Appl. No.: 401,966

[22] Filed: Sep. 1, 1989

[51] Int. Cl.[5] .............................................. B65D 41/34
[52] U.S. Cl. ..................................................... 215/252
[58] Field of Search ................................ 215/252, 258

[56] References Cited

U.S. PATENT DOCUMENTS

| Re. 32,879 | 2/1989 | Wright et al. | |
|---|---|---|---|
| 4,478,343 | 10/1984 | Ostrowsky | 215/252 |
| 4,506,795 | 3/1985 | Herr | 215/252 |
| 4,546,892 | 10/1985 | Couput | 215/252 |
| 4,592,475 | 6/1986 | Hannon et al. | 215/252 |
| 4,613,052 | 9/1986 | Gregory et al. | 215/252 |
| 4,657,153 | 3/1987 | Hayes | 215/252 |
| 4,796,770 | 1/1989 | Begley | 215/252 |
| 4,801,030 | 1/1989 | Barriac | 215/252 |
| 4,813,561 | 3/1989 | Ochs | 215/252 |
| 4,813,562 | 3/1989 | Begley | 215/252 |

FOREIGN PATENT DOCUMENTS 2033350 11/1975 United Kingdom .

Primary Examiner—Donald F. Norton
Attorney, Agent, or Firm—Wood, Herron & Evans

[57] ABSTRACT

A closure for a container has a tamper indicating band with band retaining means in the form of a conical hoop. The hoop is hinged to the band by arcuate hinges which are spaced by narrower windows along the hinge line, the windows extending partway toward but not to the inner edge of the hoop. As the hoop is turned inside out from its as-molded position to its use position, the inner edge of the hoop deforms radially adjacent the windows and thereby relieves hoop strength. As a result of the deformtion, the hoop in its use position assumes an advantageous polygonal peripheral shape rather than a circular shape.

23 Claims, 2 Drawing Sheets

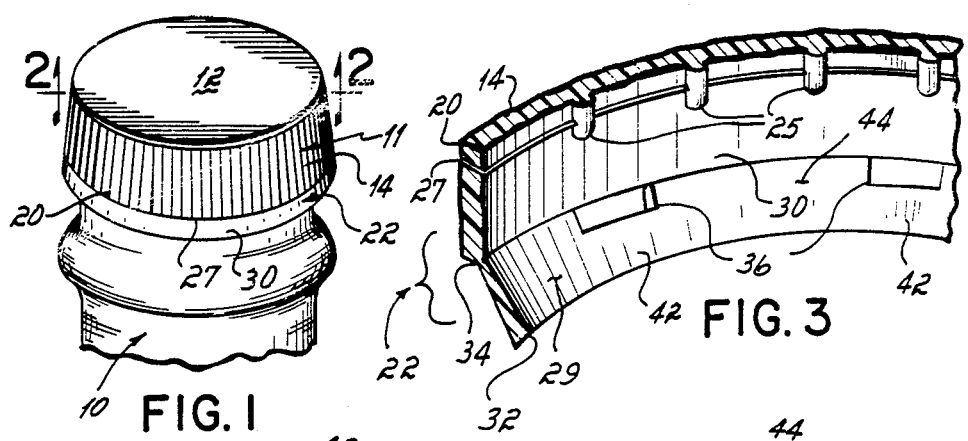
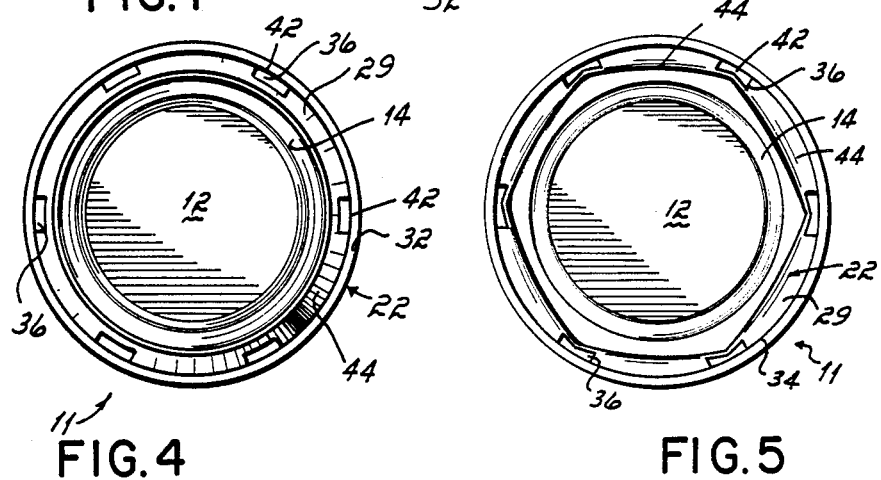
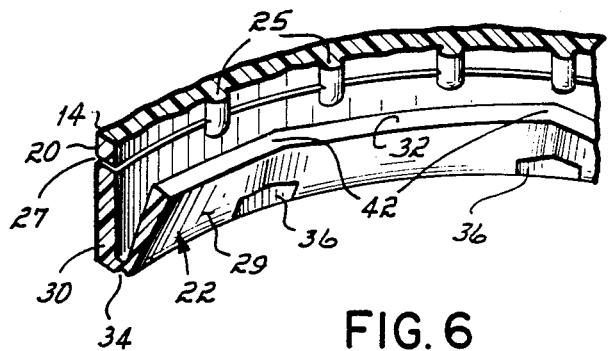
FIG. 1  FIG. 3  FIG. 4  FIG. 5  FIG. 6

TAMPER INDICATING CLOSURE HAVING RETAINING HOOP WITH RELIEF WINDOWS

This invention relates to container closures of the type having a frangible tamper indicating band which, when broken, provides a visible indication that the container has been opened.

THE PROBLEM IN THE ART

Closures having tamper indicating bands typically include a band retaining means which engages the underside of a locking bead around the neck of the container and, when the closure is opened, exerts a holddown force on the band which severs and separates the band from the upper part of the closure. A visible gap is thereupon opened between the band and the upper part of the closure, showing that the container and/or closure has been at least partially opened. The band retaining means is often in the form of upturned tabs or "fishhooks" around the inside of the band.

In order to assure that the tamper indicating band breaks in the initial opening, it is of course critical that the band retaining means positively engage the locking bead on the container and abut it, rather than sliding upwardly past the bead as the closure is removed. For this reason a relatively stiff and unflexible band retaining means is required. If the band retaining means is too pliable or flexible, it may collapse or fold down when it comes into engagement with the locking bead and thus not resist upward movement of the band, and thereby permit the closure to be removed without visibly affecting the tamper indicating band. However, closure molding usually requires that the band retaining means be molded in a "down" position in which it is angled inwardly and away from the top; if the band retaining means is too stiff it resists being turned or folded from its initial "as molded" position, to its upturned locking, bead-engaging, use position.

In some instances, a band retainer can be applied to a container in a down, as molded position; the retainer is automatically turned up or inverted up to the use position as the closure is applied to the container. In other cases, however, where the band retainer is stiffer so as better to resist inadvertent downfolding on opening, a separate post-forming operation is used to turn it up after the closure has been molded but before application to the container. In short, the stiffer the band retaining means is, the more securely it engages the locking bead when the closure is unscrewed, but the more difficult it is to invert it from the down, as made, position to the up, bead engaging, use position. Such a turn-up step can be carried out in a production line, but the application of the large force required to turn-up the band-retaining means usually slows the operation.

Thus there has been a need for a tamper-indicating closure having a band retaining means which can be turned from a down, molded position, to an up, use position, at a rate consistent with high production speeds, but which is still stiff enough to insure that the band will break.

PRIOR ART

Ostrowsky U.S. Pat. No. 4,478,343 in FIG. 10 shows a closure having a tamper indicating band with retaining tabs that are separated by thin webs. Gaps are presented between spaced apart hinged segments to make the hinge more flexible. In that closure the tabs are circumferentially flexible and, when swung through a horizontal center position, the inside dimension of the retainer is reduced by circumferential buckling or wrinkling along its inner edge.

Kerr U.S. Pat. No. 4,506,795 shows a tamper evident closure having a large number of individual tabs, each upwardly bent to engage the underside of a bead on the container. The tabs are separated from one another.

Hannon U.S. Pat. No. 4,592,475 shows another closure having circumferentially spaced tabs.

Gregory et al U.S. Pat. No. 4,613,052 shows a tamper indicating band which is generally cylindrical, connected to the lower end of a tamper indicating band by frangible bridges. The entire band is folded inwardly to a bead-engaging position by a separate post-forming operation, prior to application of the cap to the container.

My U.S. Pat. No. 4,657,153 shows a closure having upturned locking tabs for engaging beneath the bead of a container. In FIG. 7A of that patent hinges 13 at the base of tabs 10 are separated by intermediate slots 14. Each window is several times longer than the respective hinge.

Begley U.S. Pat. No. 4,796,770 shows a closure having a retaining means in the form of a plurality of hinged flaps which are separated circumferentially by notches to function independently.

In Wright Reissue U.S. Pat. No. 32,879, separately projecting stops are hinged along the lower edge of the tamper indicating band and are swung upwardly and inwardly to project into and through relief windows above the band which provide clearance for the stops to be cammed outwardly when the cap is applied.

BRIEF SUMMARY OF THE INVENTION

If the band-retaining means is provided in the form of a continuous, inwardly angulated conical hoop below the tamper indicating band, so-called "hoop strength" generally makes it difficult to turn the hoop inside out as is required to invert it from the down, as molded position, to the up, bead-engaging position. In accordance with this invention, a band-retaining hoop is connected to the band by a series of arcuate hinges along the lower edge of the band, spaced apart by shorter relief windows or deformation ports, into which the hoop deforms upon inversion.

Surprisingly, the provision of windows which are shorter in circumferential extent than the hinges provides a number of unexpected advantages. It enables the hoop to be turned inside out much more easily, prior to the time the closure is secured to the container. The windows relieve the hoop strength as the hoop is turned from its down position, through an intermediate inturned position in which its inside edge is in compression and its outside (hinge) edge is in tension, to its up position, so that the hoop can more readily be folded up for use, prior to seating on the container. This also provides a better balance between the force required to position the closure on the container, and the force required to provide the indication of tampering.

This is preferable to circumferential buckling of discontinuous band retaining means, as taught by Ostrowsky U.S. Pat. No. 4,478,343 which requires thin webs between the tabs, because such thin webs are difficult to form consistently on a production basis. The hoop of this invention can be relatively stiff, and indeed can be thicker at its inner (distal) edge than at its outer (hinge) edge. Moreover, the use of the narrow windows surprisingly causes the hoop to assume an approximately polygonal shape (as seen in plan) in the use position, in which the hoop portions inward of the hinges press more tightly against that container wall than the portions across (i.e., inward of) the windows. This provides an uneven inward force around the perimeter of the hoop against the container wall and improves the severing action of the band when the closure is opened.

Moreover, in use the entire periphery of the hoop is in engagement with or very close to the container wall; preferably there are no significant gaps between the hoop edge and the container wall. This effectively seals the retaining band against dirt and infestation which otherwise might enter from below.

Further, the small size of the windows prevents the entrance of an insect into the space between the band and the container, above the hoop. Indeed, the size of the windows as formed is reduced when the hoop is folded up, because the hoop deforms into the windows. This makes possible compliance with recommendations against having any gap larger than 0.015" in the closure.

Still further, the relief windows act as drain ports for wash water directed upwardly from container lugs to wash them, and drain through the windows at the bottom of the hoop.

DESCRIPTION OF THE DRAWINGS

The structure of the closure which provides these advantages can best be further understood by reference to the accompanying drawings, in which:

FIG. 1 is a perspective view of the top part of a container having a closure in accordance with a preferred form of this invention;

FIG. 3 is a further enlarged fragmentary perspective view of the tamper-indicating band and band-retaining hoop of the closure of FIG. 2, showing the hoop in its down, as-formed position;

FIG. 4 is a bottom plan view of the closure showing the hoop in its as-formed position;

FIG. 5 is a bottom plan view similar to FIG. 4 but shows the hoop after it has been folded to its up or use position, for engaging the container locking bead; and FIG. 6 is a fragmentary perspective view similar to FIG. 3 but shows the deformation of the hoop after it has been folded to its use position.

DETAILED DESCRIPTION

Figure 2:
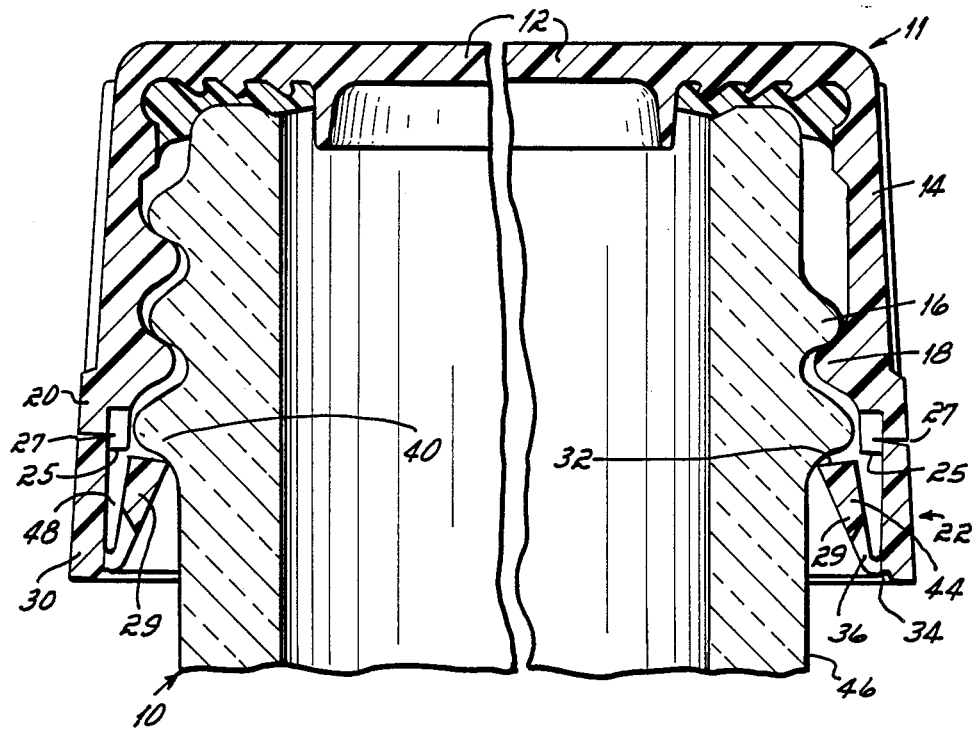
FIG. 2 is an enlarged axial cross-section taken on line 2—2 of FIG. 1.

In the drawings a container 10 is shown having a closure 11 applied to its top opening. For purposes of illustration closure 11 is shown as an integral or one-piece plastic molding, having a top 12 and integral skirt 14. However, it is contemplated that the principles of the invention are also useful with composite closures in which a metal or composite disk is inserted into an annular plastic shell. As used herein, the term "top" in reference to the closure includes both integral tops and separate tops.

The container 10 shown for purposes of illustration has closure securing means in the form of external threads 16 around its neck, which engage internal threads 18 on the inside of the closure. It will be understood, however, that the invention is useful not only on threaded containers but also on containers having interrupted canted lugs or a snap bead.

Around the lower edge 20 of closure skirt 14 there is attached a frangible or severable tamper-indicating band indicated generally by 22. This band 22 is in the form of an annulus and is formed integrally with closure shell 14, to which it is connected by a series of spaced frangible ribs or bridges 25 (see FIG. 3). The bridges 25 are formed on the inside of band 22; a circumferential score line or partial cut 27 around the outside of the shell severs band 22 from the remainder of the closure except at these bridges, which extend inwardly of the bottom of score line 27 so as not to be cut by it. These bridges act as the "weak link" along which the tamper indicating band severs or tears from the upper part of the closure. (In the preferred embodiment shown, the band 22 separates entirely from the rest of the closure when the bridges rupture, and remains on the container thereafter. It is alternatively contemplated that band 22 may remain attached to the closure by a flexible connector after the bridges 25 have been broken, so that the band does not remain on the container but rather is removed with the closure.)

As best shown in FIGS. 2 and 3, tamper-indicating band 20 has a band retaining means 29, preferably in the form of a hoop or flap which is integrally formed along the lower edge 30 of band 22. Hoop 29 is molded in a first position in which it is angulated downwardly and inwardly from skirt 14, i.e., away from top 12 (see FIG. 3). As shown in FIG. 2, the hoop is preferably tapered so that it is thicker at its inner or distal edge 32 than at its hinge edge, to provide greater stiffness.

Hoop 29 is hingedly connected to tamper-indicating band 22 by a series of hinges 34, each of which is of sufficient angular extent to act as an arcuate joint when the retainer is folded about the hinge, and thereby provide an over center hinging action. The hinges 34 are separated or spaced from one another by relief windows or ports 36, as shown in FIG. 3. The windows are preferably rectangular with outer edges which are colinear with the hinges 34. It is important that the relief windows not extend to the distal edge 32 of tamper-indicating band 22; they are open areas, not merely thin areas, which preferably begin at the hinge line 34 and preferably extend somewhat less than half of the distance to the distal or inner edge 32 of hoop 29. The closer the windows extend to edge 32, i.e., the more nearly they sever the hoop, the lesser the hoop strength. If the windows are too large the hoop may slide past the locking bead and not sever the band at the score line 27. In circumferential extent, the hinges are wider, and, depending on closure size, may be substantially wider (e.g., about 1.5–6x) than the windows between them. The width of the windows is preferably at least twice their height, depending upon the diameter of the cap.

As already indicated, these windows provide a surprising effect when the hoop 29 is inverted from its as-formed position (FIG. 3) to the use position shown in FIGS. 2 and 6, in which the inner edge 32 is positioned to engage beneath a locking band 40 of container 10. Because the hoop 29 is formed as a conical segment with a circular distal edge 32, it might be thought that after folding to the use position of FIG. 2, it would symmetrically resume a circular configuration, the two positions being symmetrical about a plane through the hinges 34. However, that does not occur. On the contrary, the hoop takes on a generally polygonal shape in use position, as shown in FIG. 5. The polygonal shape is most evident in closures with few windows.

More particularly, I have found that the provision of the relief ports 36 permits the hoop to deform radially in the regions between the hinges, as indicated at 42 in FIG. 6, and thereby relieve the compression strength that arises along its distal edge 32 as the hoop is inverted from the down position to the up position. When the hoop has been folded to the up position of FIG. 2, it surprisingly assumes the generally polygonal configuration shown in FIG. 5, rather than a circular shape; that is, the portions 42 of the hoop which extend across the windows deform radially outwardly adjacent the windows and thereby reduce the distance between the band and the hoop inner edge; whereas the portions 44 between the windows lie closer to the center axis. This shape enables the hoop better to grip the container sidewall beneath locking band 40, regardless of manufacturing tolerances in the dimensions of the container and the closure, and more certainly to shear the ribs 25 and cause the tamper-indicating band to separate.

Because the hoop normally seals relatively tightly to the container around its entire periphery, it acts as a seal against insect infestation. The fit can be so close that no opening between the distal edge of the hoop and the container wall exceeds the maximum recommended limit of 0.015". The windows are partially closed by the deformed hoop, and the gap above them may itself be less than 0.015". Moreover, the distance from the line of contact of the distal edge 32 of the hoop, to the bottom 34 of the closure, may be ⅛" or less, in compliance with federal APHIS regulations. This avoids possible intake of dirt or contamination into the container when the vacuum is broken.

Apart from its function in relieving hoop strength as the band-retainer is inverted to the use position, the present closure facilitates water washing of the interthread space between the closure and the container. A water wash spray directed upwardly toward the distal edge of the hoop can locally push that edge from the container and pass upwardly through this gap and flow between the lugs or interrupted threads to wash them. The water runs downwardly into the V-shaped pocket 48, carrying any entrained food particles, and drains out through the windows 36.

Having described the invention, what is claimed is:

1. A tamper indicating closure for use in sealing a container of the type having closure securing means and a locking bead below the securing means, said closure comprising, a top, a shell with a depending skirt, means on said skirt for engaging the closure securing means of the container, a tamper indicating band frangibly attached to and depending from said skirt, a band-retaining hoop around a lower edge of said band for engaging the container below the locking bead thereof, arcuate hinges connecting said hoop to said band, said hinges spaced along said lower edge of said band, and relief windows in said hoop, said windows being adjacent said lower edge and spacing said hinges, said hoop being movable from a first position in which it projects angularly inward in a direction away from said top, to a second position in which it projects angularly inward and toward said top, for engagement with the locking bead of a container, the portions of said hoop which extend across the respective windows being deformed radially outwardly when the hoop is in said second position.

2. The closure of claim 1 wherein the circumferential width of the hinges is greater than the circumferential width of the windows.

3. The closure of claim 2 wherein the width of the hinges is in the range of 1.5 to 6x the width of the windows.

4. The closure of claim 1 wherein said hoop has a distal edge which is continuous around the entire circumference thereof.

5. The closure of claim 4 wherein said windows do not extend to said distal edge.

6. The closure of claim 1 wherein said windows have outer edges which are colinear with said hinges.

7. The closure of claim 1 wherein said hoop in said first position is in the form of a truncated conical hoop having a circular distal perimeter, and in said second position has a distal edge of polygonal shape wherein portions of said edge which are between said windows lie radially inward of portions thereof which are across said windows.

8. The closure of claim 7 wherein said distal edge is cold set by said deformation when said hoop is moved from said first position to said second position.

9. The closure of claim 1 wherein said closure is molded with said hoop in said first position.

10. The closure of claim 1 wherein the width of the windows is at least twice their height.

11. The closure of claim 1 wherein said hoop is thicker along said distal edge than along said hinges.

12. The closure of claim 1 wherein said closure is an integral molding of plastic and has a unitary top.

13. The closure of claim 1 wherein said means on the closure for engaging the closure securing means of the container are threads.

14. A sealed package comprising a container and a closure secured thereon, said container being of the type having closure securing means and a locking bead below the securing means, said closure comprising, a top, a shell with a depending skirt, means on said skirt engaging the closure securing means of the container, a tamper indicating band frangibly attached to and depending from said skirt, a retaining hoop around a lower edge of said band, arcuate hinges spaced along said hoop and connecting said hoop to a lower edge of said band, and windows in said hoop, said windows being adjacent said lower edge and spacing said hinges apart, said hoop projecting angularly inward in a direction toward said top and engaging said container below said locking bead, the portions of said hoop which lie across of the respective windows being deformed radially outward toward said band.

15. The package of claim 14 wherein portions of said hoop between said windows bind against the container more tightly than portions of said hoop across said windows and thereby facilitate release of said tamper indicating band from said closure when the closure is rotated to open the package.

16. The package of claim 14 wherein said hoop has a distal edge which is continuous around the entire circumference thereof.

17. The package of claim 16 wherein said hoop is thickest along said distal edge.

18. The package of claim 14 wherein said windows have outer edges which are colinear with said hinges.

19. The package of claim 14 wherein the circumferential width of said hinges is greater than the circumferential width of said windows.

20. The package of claim 19 wherein said hinges are in the range of 1.5–6x the width of said windows.

21. The package of claim 14 wherein the width of said relief windows is at least twice their height.

22. The package of claim 14 wherein said closure is an integral molding of plastic and said top is unitary with it.

23. The package of claim 14 wherein said means of the closure for engaging the closure securing means of the container are screw threads.

* * * * *